(12) United States Patent
Tsuruta et al.

(10) Patent No.: US 8,892,411 B2
(45) Date of Patent: Nov. 18, 2014

(54) INFORMATION PROCESSOR, POWER GENERATION DETERMINING METHOD, AND PROGRAM

(75) Inventors: Kosuke Tsuruta, Sakai (JP); Yumi Tsutsumi, Yawata (JP); Takuya Nakai, Kyoto (JP)

(73) Assignee: Omron Corporation, Kyoto (JP)

( * ) Notice: Subject to any disclaimer, the term of this patent is extended or adjusted under 35 U.S.C. 154(b) by 335 days.

(21) Appl. No.: 13/565,353

(22) Filed: Aug. 2, 2012

(65) Prior Publication Data

US 2013/0085729 A1 Apr. 4, 2013

(30) Foreign Application Priority Data

Sep. 29, 2011 (JP) ................................. 2011-213663

(51) Int. Cl.
*G06G 7/48* (2006.01)
*G06F 17/50* (2006.01)
*H02S 10/00* (2014.01)
*H01L 31/04* (2014.01)
*G06F 1/26* (2006.01)
*G01R 31/40* (2014.01)

(52) U.S. Cl.
CPC .............. *G06F 17/5009* (2013.01); *H02N 6/00* (2013.01); *H01L 31/0406* (2013.01); *G06F 1/26* (2013.01); *G01R 31/405* (2013.01); *G06F 2217/78* (2013.01); *Y04S 40/22* (2013.01); *Y02E 60/76* (2013.01)
USPC .............................................. 703/6; 136/244

(58) Field of Classification Search
CPC .............. G06F 1/26; G06F 1/28; G06F 19/00; G06F 5/00; G06F 13/14; G06F 17/00; G06F 17/10; G06Q 40/00; G01R 31/00; G01R 21/06; G05B 15/00; F01B 21/04; F01K 15/00; F01K 23/00; F02B 73/00; H01L 25/00; H01L 31/042; H01L 31/0406; H01M 10/446; H02M 7/44; H02N 6/00
USPC .................. 703/6, 7; 700/287, 291, 292, 297; 702/58, 60; 60/698; 136/244, 291
See application file for complete search history.

(56) References Cited

U.S. PATENT DOCUMENTS 8,386,197 B1 * 2/2013 Plaisted et al. ................... 702/58
2005/0198963 A1 * 9/2005 Wai et al. ......................... 60/698

(Continued)

FOREIGN PATENT DOCUMENTS

JP 2007-173657 7/2007

*Primary Examiner* — Kandasamy Thangavelu
(74) *Attorney, Agent, or Firm* — Greenblum & Bernstein, P.L.C.

(57) ABSTRACT

An estimated value or a predicted value of an output of photovoltaic generation is easily and properly determined. A learning processor constructs an output calculating model based on a measured value of an output of photovoltaic generation, sunshine hours, and a solar altitude in a learning period. The output calculating model calculates the output of the photovoltaic generation based on the sunshine hours and the solar altitude. An output calculator calculates an estimated value of the output of the photovoltaic generation in an estimation period and a predicted value of the output of the photovoltaic generation in a prediction period based on a measured value of the sunshine hours in the estimation period and the solar altitude or a predicted value of the sunshine hours in the prediction period and the solar altitude. Additionally, the features may be applied to a photovoltaic power system.

20 Claims, 15 Drawing Sheets

(56) References Cited

U.S. PATENT DOCUMENTS

| | | | |
|---|---|---|---|
| 2006/0065302 A1* | 3/2006 | Gibson et al. | 136/291 |
| 2009/0126774 A1* | 5/2009 | Taylor et al. | 136/244 |
| 2011/0270546 A1* | 11/2011 | Smith | 702/60 |
| 2011/0307109 A1* | 12/2011 | Sri-Jayantha | 700/291 |
| 2011/0307199 A1* | 12/2011 | Klein et al. | 702/60 |
| 2012/0158205 A1* | 6/2012 | Hinman et al. | 700/297 |
| 2013/0006431 A1* | 1/2013 | Marroyo Palomo et al. | 700/287 |
| 2013/0030587 A1* | 1/2013 | El-Barbari et al. | 700/292 |

\* cited by examiner

FIG. 4

| t | | y(t) | s(t) | h(φ,L,t) | x(t) |
|---|---|---|---|---|---|
| DATE AND TIME | | POWER GENERATION (MEASURED VALUE) (Wh) | SUNSHINE HOURS (MINUTE) | SOLAR ALTITUDE (DEGREE) | SUNSHINE STATE |
| 2010/12/14 | 10:00 | 158.367687 | 0 | 26.362041 | 0 |
| 2010/12/14 | 10:10 | 281.5949585 | 0 | 27.307038 | 0 |
| 2010/12/14 | 10:20 | 295.7780375 | 1 | 28.175643 | 0.472176071 |
| 2010/12/14 | 10:30 | 319.6477763 | 0 | 28.964541 | 0 |
| 2010/12/14 | 10:40 | 318.2130971 | 1 | 29.670555 | 0.495012203 |
| 2010/12/14 | 10:50 | 114.0935038 | 0 | 30.290701 | 0 |
| 2010/12/14 | 11:00 | 101.9551687 | 0 | 30.822241 | 0 |
| 2010/12/14 | 11:10 | 75.52504402 | 4 | 31.262737 | 2.075853178 |
| 2010/12/14 | 11:20 | 89.69275437 | 10 | 31.610102 | 5.241360685 |
| 2010/12/14 | 11:30 | 302.3233999 | 10 | 31.862646 | 5.278847351 |
| 2010/12/14 | 11:40 | 371.6817301 | 8 | 32.019114 | 4.241617164 |
| 2010/12/14 | 11:50 | 336.8610331 | 6 | 32.078719 | 3.186503411 |
| 2010/12/14 | 12:00 | 280.9822103 | 2 | 32.041159 | 1.061056663 |
| 2010/12/14 | 12:10 | 253.9115824 | 5 | 31.906623 | 2.642682333 |
| 2010/12/14 | 12:20 | 271.2674784 | 8 | 31.675792 | 4.200897029 |
| 2010/12/14 | 12:30 | 106.89422322 | 6 | 31.349815 | 3.121570875 |
| 2010/12/14 | 12:40 | 73.6445104 | 0 | 30.930288 | 0 |
| 2010/12/14 | 12:50 | 58.2680471 | 3 | 30.41921 | 1.518968752 |
| 2010/12/14 | 13:00 | 79.1065918 | 9 | 29.818945 | 4.475347765 |
| ... | | ... | ... | ... | ... |

FIG. 7

| DATE AND TIME | s(t) SUNSHINE HOURS (MINUTE) | h(φ,L,t) SOLAR ALTITUDE (DEGREE) | x(t) SUNSHINE STATE | y(t) POWER GENERATION (ESTIMATED) (Wh) |
|---|---|---|---|---|
| 2010/12/28 10:00 | 10 | 25.491654 | 4.30379617 | 254.1005198 |
| 2010/12/28 10:10 | 10 | 26.480327 | 4.458905034 | 262.7303658 |
| 2010/12/28 10:20 | 10 | 27.394972 | 4.601218726 | 270.6483224 |
| 2010/12/28 10:30 | 10 | 28.232243 | 4.730466405 | 277.8393205 |
| 2010/12/28 10:40 | 10 | 28.988903 | 4.846402155 | 284.2896784 |
| 2010/12/28 10:50 | 10 | 29.661872 | 4.9488052 | 289.9871123 |
| 2010/12/28 11:00 | 10 | 30.248282 | 5.037480749 | 294.9207848 |
| 2010/12/28 11:10 | 10 | 30.745527 | 5.1122599919 | 299.0812995 |
| 2010/12/28 11:20 | 10 | 31.151316 | 5.173000228 | 302.4607293 |
| 2010/12/28 11:30 | 10 | 31.463724 | 5.219586232 | 305.052651 |
| 2010/12/28 11:40 | 10 | 31.681231 | 5.251929135 | 306.8521244 |
| 2010/12/28 11:50 | 10 | 31.80276 | 5.269967351 | 307.855723 |
| 2010/12/28 12:00 | 10 | 31.827704 | 5.273666791 | 308.06155 |
| 2010/12/28 12:10 | 10 | 31.755936 | 5.263020197 | 307.4692017 |
| 2010/12/28 12:20 | 10 | 31.587816 | 5.238047736 | 306.0798002 |
| 2010/12/28 12:30 | 10 | 31.324184 | 5.198797245 | 303.8960069 |
| 2010/12/28 12:40 | 10 | 30.966334 | 5.145343295 | 300.9219709 |
| 2010/12/28 12:50 | 9 | 30.515986 | 4.570008704 | 268.9118795 |
| 2010/12/28 13:00 | 1 | 29.97525 | 0.499625857 | 42.44656851 |
| ... | ... | ... | ... | ... |

IN THE CASE OF "SUNNY"

IN THE CASE OF "SUNNY, AND OCCASIONAL RAIN IN AFTERNOON"

IN THE CASE OF "SUNNY, AND TEMPORARY RAIN IN AFTERNOON"

INFORMATION PROCESSOR, POWER GENERATION DETERMINING METHOD, AND PROGRAM

CROSS-REFERENCE TO RELATED APPLICATION

This application claims benefit of priority under 35 U.S.C. §119 to Japanese Patent Application No. 2011-213663 filed on Sep. 29, 2011, which is expressly incorporated herein by reference in its entirety.

TECHNICAL FIELD

The present invention relates to an information processing device, a power generation calculating method, and a program, particularly to an information processing device, a power generation calculating method, which are suitable for use of estimation or prediction of an output of photovoltaic generation.

RELATED ART

Conventionally there is proposed a method for calculating an estimated value (proper value) or a predicted value of the output of the photovoltaic generation using an solar radiation amount or solar radiation intensity (for example, see Japanese Unexamined Patent Publication No. 2007-173657).

SUMMARY

However, because there are at most several tens of observation points for an amount of global solar radiation in the Meteorological Agency, data around a site where the photovoltaic generation is performed is not always obtained.

Because the amount of global solar radiation is measured on a horizontal surface, for example, it is necessary to set parameters, such as a solar panel installation orientation and a solar panel installation angle, and to convert the amount of global solar radiation measured on the horizontal surface into a sloping-surface solar radiation amount using the set parameters. Additionally, because power generation characteristics with respect to the solar radiation amount and solar radiation intensity depend on a manufacturer and a model, it is necessary that various parameters corresponding to the power generation characteristics be set to calculate the power generation. The parameter setting is hardly performed by a general user, and is extremely troublesome work.

It is also conceivable that a pyrheliometer is placed in the solar panel installation site to measure the solar radiation amount and the solar radiation intensity. However, the pyrheliometer is expensive and is unfamiliar to a standard home.

The present invention has been devised to solve the problems described above, and an object thereof is to be able to easily and properly calculate the estimated value or the predicted value of the output of the photovoltaic generation.

In accordance with a first aspect of the present invention, an information processing device includes: a model constructing part (e.g., a model constructing processor) that constructs a first model based on a measured value of an output of photovoltaic generation, sunshine hours, and a solar altitude in a first period, the first model calculating the output of the photovoltaic generation based on the sunshine hours and the solar altitude; and an output calculator that calculates the output of the photovoltaic generation in a second period based on the sunshine hours and the solar altitude in the second period using the first model.

In the information processing device in accordance with the first aspect of the present invention, the first model is constructed based on the measured value of the output of the photovoltaic generation, the sunshine hours, and the solar altitude in the first period, the first model calculating the output of the photovoltaic generation based on the sunshine hours and the solar altitude; and the output of the photovoltaic generation is calculated in the second period based on the sunshine hours and the solar altitude in the second period using the first model.

Accordingly, the estimated value or the predicted value of the output of the photovoltaic generation can easily and properly be calculated.

For example, the model constructing part and the output calculator include a computer or a controller, such as a CPU.

The first model may be a model that calculates the output of the photovoltaic generation based on a sunshine state obtained by a product of the sunshine hours and a sine of the solar altitude.

Therefore, the model for calculating the output of the photovoltaic generation can be constructed by the simple calculation formula.

The information processing device may further include: a solar altitude calculator that calculates the solar altitude on specified latitude and longitude; and a sunshine state calculator that calculates the sunshine state based on provided data of the sunshine hours and the solar altitude calculated by the solar altitude calculator, wherein the output calculator calculates the output of the photovoltaic generation based on the sunshine state calculated by the sunshine state calculator.

Therefore, the estimated value or the predicted value of the output of the photovoltaic generation can properly be obtained only by providing the latitude, the longitude, and the sunshine hours around the power generation site.

For example, the solar altitude calculator and the sunshine state calculator include a computer or a controller, such as a CPU.

The information processing device may further include a sunshine hours predicting part (e.g., a sunshine hours processor) that predicts the sunshine hours based on a weather forecast, wherein the sunshine state calculator calculates a predicted value of the sunshine state based on the sunshine hours predicted by the sunshine hours predicting part, and the output calculator calculates a predicted value of the output of the photovoltaic generation based on the predicted value of the sunshine state.

Therefore, the output of the photovoltaic generation can properly be estimated based on the weather forecast around the power generation site.

For example, the sunshine hours predicting part includes a computer or a controller, such as a CPU.

The model constructing part may further construct a second model based on the measured value of the output of the photovoltaic generation in a period in which the sunshine hours are zero, the second model calculating the output of the photovoltaic generation in the period in which the sunshine hours are zero, and the output calculator may calculate the output of the photovoltaic generation using the second model in the period in which the sunshine hours are zero in the second period.

Therefore, the estimated value or the predicted value of the output of the photovoltaic generation can properly be calculated even in the case of the sunshine hours of zero.

The information processing device may further include an emergency detector that detects an emergency of a system performing the photovoltaic generation by comparing a calculated value of the output of the photovoltaic generation, which is calculated by the output calculator in the second period, and the measured value of the output of the photovoltaic generation in the second period.

Therefore, the emergency of the photovoltaic power system can easily and properly be detected.

For example, the emergency detector includes a computer or a controller, such as a CPU.

The information processing device may further include an output measuring part (e.g., an output measuring processor) that measures the output of the photovoltaic generation, wherein the model constructing part constructs the first model based on the measured value of the output of the photovoltaic generation, which is measured by the output measuring part in the first period.

Therefore, the output of the photovoltaic generation is automatically measured, and the output calculating model can be constructed based on the measurement result.

For example, the output measuring part includes a computer or a controller, such as a CPU. Additionally, a sensor can be provided in order to measure a voltage and a current.

In accordance with a second aspect of the present invention, a power generation calculating or determining method includes the steps of: constructing a model based on a measured value of an output of photovoltaic generation, sunshine hours, and a solar altitude in a first period, the model calculating the output of the photovoltaic generation based on the sunshine hours and the solar altitude; and calculating the output of the photovoltaic generation in a second period based on the sunshine hours and the solar altitude in the second period using the model.

In the power generation calculating method in accordance with the second aspect of the present invention, the model is constructed based on the measured value of the output of the photovoltaic generation, the sunshine hours, and the solar altitude in the first period, the model calculating the output of the photovoltaic generation based on the sunshine hours and the solar altitude; and the output of the photovoltaic generation is calculated in the second period based on the sunshine hours and the solar altitude in the second period using the model.

Accordingly, the estimated value or the predicted value of the output of the photovoltaic generation can easily and properly be calculated.

For example, the model constructing step and the power generation calculating step are performed by a computer or a controller, such as a CPU.

The power generation calculating method may further include the step of measuring the output of the photovoltaic generation in the first period, wherein the model is constructed in the model constructing step based on the measured value of the output of the photovoltaic generation, which is measured in the first period in the output measuring step.

Therefore, the output of the photovoltaic generation is automatically measured, and the output calculating model can be constructed based on the measurement result.

In accordance with a third aspect of the present invention, a program that causes a computer to perform processing, the processing includes the steps of: constructing a model based on a measured value of an output of photovoltaic generation, sunshine hours, and a solar altitude in a first period, the model calculating the output of the photovoltaic generation based on the sunshine hours and the solar altitude; and calculating the output of the photovoltaic generation in a second period based on the sunshine hours and the solar altitude in the second period using the model.

In the program in accordance with the third aspect of the present invention that causes the computer to perform processing, the model is constructed based on the measured value of the output of the photovoltaic generation, the sunshine hours, and the solar altitude in the first period, the model calculating the output of the photovoltaic generation based on the sunshine hours and the solar altitude; and the output of the photovoltaic generation is calculated in the second period based on the sunshine hours and the solar altitude in the second period using the model.

Accordingly, the estimated value or the predicted value of the output of the photovoltaic generation can easily and properly be calculated.

In accordance with a fourth aspect of the present invention, a photovoltaic power system includes: a photovoltaic generation part (e.g., a photovoltaic generator) that performs photovoltaic generation; an output measuring part that measures an output of the photovoltaic generation part; a model constructing part that constructs a model based on a measured value of the output of the photovoltaic generation part, sunshine hours, and a solar altitude in a first period, the model calculating the output of the photovoltaic generation part based on the sunshine hours and the solar altitude; and an output calculator that calculates the output of the photovoltaic generation part in a second period based on the sunshine hours and the solar altitude in the second period using the model.

In the photovoltaic power system in accordance with the fourth aspect of the present invention, the photovoltaic generation is performed, the output of the photovoltaic generation part is measured, the model is constructed based on the measured value of the output of the photovoltaic generation, the sunshine hours, and the solar altitude in the first period, the model calculating the output of the photovoltaic generation based on the sunshine hours and the solar altitude; and the output of the photovoltaic generation is calculated in the second period based on the sunshine hours and the solar altitude in the second period using the model.

Accordingly, the estimated value or the predicted value of the output of the photovoltaic generation can easily and properly be calculated.

For example, the photovoltaic generation part includes a photovoltaic module and a power conditioner. For example, the output measuring part includes a computer or a controller, such as a CPU. Additionally, a sensor can be provided in order to measure a voltage and a current. For example, the model constructing part and the output calculator include a computer or a controller, such as a CPU.

According to the first to fourth aspects of the present invention, the estimated value or the predicted value of the output of the photovoltaic generation can easily and properly be calculated.

BRIEF DESCRIPTION OF THE DRAWINGS

FIG. 4 is a view illustrating an example of data used in the output calculating model learning processing;

FIG. 7 is a graph illustrating an example of data used in the power generation estimation processing;

DETAILED DESCRIPTION

Hereinafter, a preferred embodiment of the present invention (hereinafter referred to as an embodiment) will be described with reference to the drawings. The description is made as follows.

1. Embodiment
2. Modifications

In the following description, "power generation is estimated" or "estimated value (or proper value) of output is calculated" means that a proper value of an output of photovoltaic generation is calculated based on the past performance data. "Power generation is predicted" or "predicted value of power generation is calculated" means that a predicted value of the output of the photovoltaic generation is calculated based on the predicted data in the future.

1. Embodiment

Configuration Example of Photovoltaic Power System 101

Figure 1:
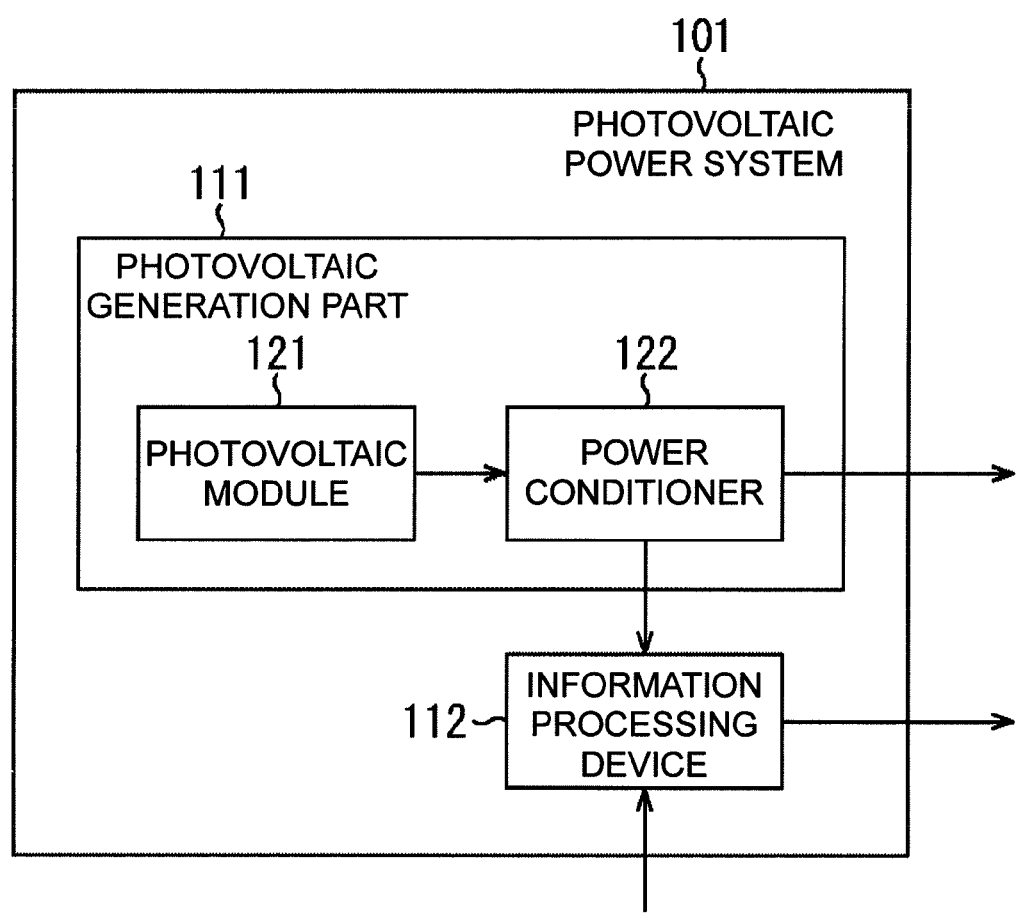
FIG. 1 is a block diagram illustrating a photovoltaic power system according to an embodiment of the present invention.

FIG. 1 is a block diagram illustrating a photovoltaic power system according to an embodiment of the present invention.

The photovoltaic power system 101 includes a photovoltaic generation part 111 and an information processing device 112. The photovoltaic generation part 111 includes a photovoltaic module 121 and a power conditioner 122.

The photovoltaic module 121 generates a DC power by the photovoltaic generation, and supplies the generated DC power to the power conditioner 122.

The power conditioner 122 converts the DC power from the photovoltaic module 121 into an AC power having the substantially same voltage and frequency as a commercial power source, and synchronizes a phase of a voltage of the converted AC power with a phase of a voltage of the commercial power source. The power conditioner 122 outputs the AC power (hereinafter referred to as a generated power).

For example, the information processing device 112 includes a computer. The information processing device 112 acquires measured values of the voltage and current of the generated power from the power conditioner 122 or a sensor, which is provided in an electric power system to which the generated power is supplied from the power conditioner 122, and measures the output of the photovoltaic generation part 111.

The information processing device 112 acquires data indicating a latitude and a longitude of a site where the photovoltaic module 121 is installed (more correctly, the site where a solar panel provided in the photovoltaic module 121 is installed) (hereinafter referred to as a power generation site) and measurement data of sunshine hours around the power generation site (hereinafter referred to as sunshine hours measurement data), and estimates the output of the photovoltaic generation part 111 in a period specified by a user based on the acquired pieces of data. The information processing device 112 detects an emergency of the photovoltaic generation part 111 by comparing the measured value and the estimated value of the output of the photovoltaic generation part 111.

The information processing device 112 acquires predicted data of the sunshine hours around the power generation site (hereinafter referred to as sunshine hours predicted data) or data of a weather forecast, and predicts the output of the photovoltaic generation part 111 in the period specified by the user based on the acquired pieces of data.

The information processing device 112 notifies the user of the measurement result, the estimation result, and the prediction result of the output and the detection result of the emergency of the photovoltaic generation part 111, or outputs the measurement result, the estimation result, and the prediction result of the output and the detection result of the emergency of the photovoltaic generation part 111 to an external server.

[Configuration Example of Information Processing Device 112]

Figure 2:
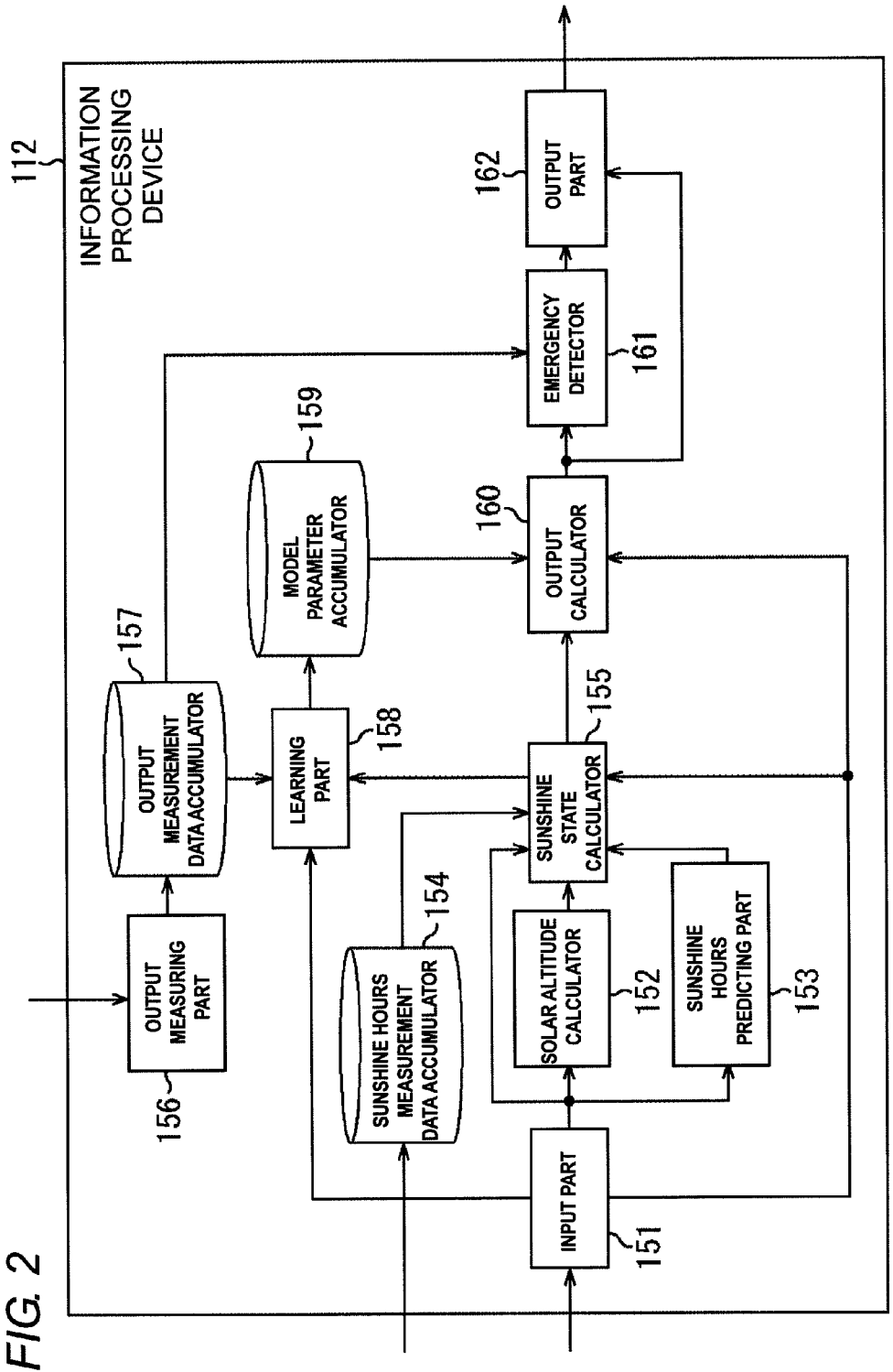
FIG. 2 is a block diagram illustrating a configuration example of a function of an information processing device in the photovoltaic power system.

FIG. 2 is a block diagram illustrating a configuration example of the information processing device 112.

The information processing device 112 includes an input part 151, a solar altitude calculator 152, a sunshine hours predicting part 153, a sunshine hours measurement data accumulator 154, a sunshine state calculator 155, an output measuring part 156, a output measurement data accumulator 157, a learning part 158, a model parameter accumulator 159, an output calculator 160, an emergency detector 161, and an output part 162.

For example, the input part 151 includes input devices, such as a keyboard, a mouse, a button, a switch, and a microphone, and the user uses the input part 151 in order to input a command or data to the information processing device 112. The input part 151 supplies the input command or data to the solar altitude calculator 152, the sunshine hours predicting part 153, the sunshine state calculator 155, the learning part 158, and the output calculator 160 as needed basis.

Examples of the data input by the user include the latitude and the longitude of the power generation site, the sunshine hours predicted data or the weather forecast data around the power generation site, a learning period of an output calculating model, and an estimation period and a prediction period of the output.

The solar altitude calculator 152 calculates a solar altitude around the power generation site in the period specified by the user, and supplies the calculation result to the sunshine state calculator 155.

The sunshine hours predicting part 153 predicts the sunshine hours based on the weather forecast around the power generation site, and supplies the sunshine hours predicted data obtained by the prediction to the sunshine state calculator 155.

The sunshine hours measurement data accumulator 154 accumulates the periodically-input sunshine hours measurement data around the power generation site.

For example, the sunshine hours observation data by the Meteorological Agency is used as the sunshine hours measurement data. Because the sunshine hours are observed in points more than those of the amount of global solar radiation, the data can be acquired at the point closer to the power generation site compared with the amount of global solar radiation.

The sunshine state calculator 155 calculates the sunshine state around the power generation site based on the sunshine hours and the solar altitude around the power generation site For example, the sunshine state calculator 155 estimates the sunshine state (calculates the estimated value of the sunshine state) around the power generation site in the period specified by the user based on the sunshine hours measurement data accumulated in the sunshine hours measurement data accumulator 154 and the solar altitude calculated by the solar altitude calculator 152. The sunshine state calculator 155 supplies the estimation result to the learning part 158 and the output calculator 160.

For example, the sunshine state calculator 155 predicts the sunshine state (calculates the predicted value of the sunshine state) around the power generation site in the period specified by the user based on the sunshine hours predicted data input through the input part 151 or the sunshine hours predicted data supplied from the sunshine hours predicting part 153 and the solar altitude calculated by the solar altitude calculator 152. The sunshine state calculator 155 supplies the prediction result to the output calculator 160.

The power generation output measuring part 156 acquires the measured values of the voltage and current of the generated power from the power conditioner 122 or the sensor, which is provided in the electric power system to which the generated power is supplied from the power conditioner 122, and measures the output of the photovoltaic generation part 111 based on the measured values. The output measuring part 156 accumulates output measurement data indicating the measurement result in the output measurement data accumulator 157.

Using a predetermined learning model, the learning part 158 learns a model for calculation of the output of the photovoltaic generation part 111 (hereinafter referred to as an output calculating model) based on the sunshine state obtained by the sunshine hours and the solar altitude around the power generation site, and constructs the output calculating model. The learning part 158 accumulates a parameter indicating the constructed output calculating model in the model parameter accumulator 159.

The output calculator 160 calculates the output of the photovoltaic generation part 111 using the output calculating model indicated by the parameter accumulated in the model parameter accumulator 159.

For example, using the output calculating model, the output calculator 160 estimates the output of the photovoltaic generation part 111 (calculates the estimated value of the output) in the period specified by the user based on the sunshine state around the power generation site, which is estimated by the sunshine state calculator 155. The output calculator 160 supplies the estimation result to the emergency detector 161 and the output part 162.

For example, using the output calculating model, the output calculator 160 predicts the output of the photovoltaic generation part 111 (calculates the predicted value of the output) in the period specified by the user based on the sunshine state around the power generation site, which is predicted by the sunshine state calculator 155. The output calculator 160 supplies the prediction result to the output part 162.

The emergency detector 161 detects the emergency of the photovoltaic generation part 111 by comparing the estimated value of the output of the photovoltaic generation part 111, which is calculated by the output calculator 160, and the measured value of the output of the photovoltaic generation part 111, which is accumulated in the photovoltaic generation measurement data accumulator 157. The emergency detector 161 supplies the detection result to the output part 162.

For example, the output part 162 includes a display, a light emitting device, a speaker, a communication device, and an output interface. For example, the output part 162 notifies the user of the measurement result, the estimation result, and the prediction result of the output of the photovoltaic generation part 111 and the detection result of the emergency of the photovoltaic generation part 111 by an image, light, or a sound, or the output part 162 outputs the measurement result, the estimation result, and the prediction result of the output of the photovoltaic generation part 111 and the detection result of the emergency of the photovoltaic generation part 111 to an external server, a mobile terminal, a printer, and a storage device.

[Processing of Information Processing Device 112]

Processing of the information processing device 112 will be described below with reference to FIGS. 3 to 12.

[Output Calculating Model Learning Processing]

Output calculating model learning processing performed by the information processing device 112 will be described with reference to a flowchart in FIG. 3.

In Step S1, the information processing device 112 acquires a learning condition. For example, the user inputs the latitude and the longitude of the power generation site and the learning period of the output calculating model are input as the learning condition through the input part 151. For example, the learning period is specified by date and time when the learning is started and date and time when the learning is ended.

The input part 151 supplies the data indicating the latitude and the longitude of the power generation site to the solar altitude calculator 152 and the learning part 158. The input part 151 supplies the data indicating the learning period to the solar altitude calculator 152, the sunshine state calculator 155, and the learning part 158.

In Step S2, the solar altitude calculator 152 calculates a solar altitude. For example, a solar altitude $h(\phi, L, t)$ at date and time $t$ in a point on a latitude $\phi$ and a longitude $L$ can be calculated using the following equations (1) to (6).

$$h(\phi,L,t)=\arcsin(\sin\phi\cdot\sin\delta+\cos\phi\cdot\cos\delta\cdot\cos HA) \quad (1)$$

$$\omega[\text{rad}]=2\pi\cdot(N-1) \quad (2)$$

$$\delta[\text{rad}]=0.006918-0.399912\cdot\cos\omega+0.070257\cdot\sin\omega-0.006758\cdot\cos 2\omega+0.000907\cdot\sin 2\omega-0.002697\cdot\cos 3\omega+0.001480\cdot\sin 3\omega \quad (3)$$

$$e[\text{hour}]=0.000075+0.001868\cdot\cos\omega-0.032077\cdot\sin\omega-0.014615\cdot\cos 2\omega-0.040849\cdot\sin 2\omega \quad (4)$$

$$HA[\text{rad}]=\pi\{(T+L/15-9+e)-12\}/12 \quad (5)$$

$$HA[\text{rad}]=\pi\{(T+L/15-9+e)+12\}/12 \quad (6)$$

Where N is the number of days from the first day of the year on a day indicated by the date and time t. T is a time indicated by the date and time t. ω is an angle on an orbital path of the earth when a position of the first day of the year is originated. δ is a solar declination. e is a time equation. HA is an hour angle, the hour angle HA in the morning is obtained by the equation (5), and the hour angle HA in the afternoon is obtained by the equation (6).

Using the equations (1) to (6), the solar altitude calculator 152 calculates the solar altitude every predetermined time (for example, every 10 minutes) around the power generation site in the specified learning period. The solar altitude calculator 152 supplies the calculation result to the sunshine state calculator 155.

In Step S3, the sunshine state calculator 155 estimates the sunshine state. Specifically, the sunshine state calculator 155 acquires the sunshine hours measurement data around the power generation site in the specified learning period from the sunshine hours measurement data accumulator 154.

For example, the sunshine hours measurement data is expressed every predetermined unit time by a time when the solar radiation amount is greater than or equal to a predetermined threshold (for example, 120 W/m$^2$) in the unit time. For example, assuming that the unit time is ten minutes, and that the time when the solar radiation amount is greater than or equal to the threshold is eight minutes between 12:10 and 12:20, the sunshine hours are eight minutes in the period.

Alternatively, for example, the sunshine hours measurement data may be expressed by a ratio (for example, a unit is %) in which the solar radiation amount is greater than or equal to a predetermined threshold in the unit time or the existence or non-existence of the sunshine in the unit time. In the latter case, for example, the sunshine hours measurement data is expressed by "existence of sunshine" when the time in which the solar radiation amount is greater than or equal to the threshold is greater than or equal to a predetermined time in the unit time, and the sunshine hours measurement data is expressed by "non-existence of sunshine" when the time in which the solar radiation amount is greater than or equal to the threshold is less than the time in the unit time. The sunshine state calculator 155 calculates the estimated value of a sunshine state x(t) every predetermined time in the learning period using an equation (7).

$$x(t)=s(t) \cdot \sin \{h(\phi,L,t)\} \quad (7)$$

Where s(t) is the sunshine hours of a time period including the date and time t. Accordingly, the sunshine state x(t) at the date and time t is obtained by a product of the sunshine hours s(t) in the time period including the date and time t and a sine (sin) of the solar altitude h($\phi$, L, t) at the date and time t.

FIG. 4 illustrates examples of the pieces of data in which the measured value of an output y(t) of the photovoltaic generation part 111, the sunshine hours s(t), the solar altitude h($\phi$, L, t), and the sunshine state x(t) are arrayed in time series. For example, the sunshine state x(t) at 11:10 on Dec. 14, 2010 is obtained by the following equation (8) based on the sunshine hours s(t) between 11:1 and 11:10 on Dec. 14, 2010 and the solar altitude h($\phi$, L, t) at 11:10 on Dec. 14, 2010.

$$x(t)=4 \times \sin(31.262737)=2.075853178 \quad (8)$$

Figure 5:
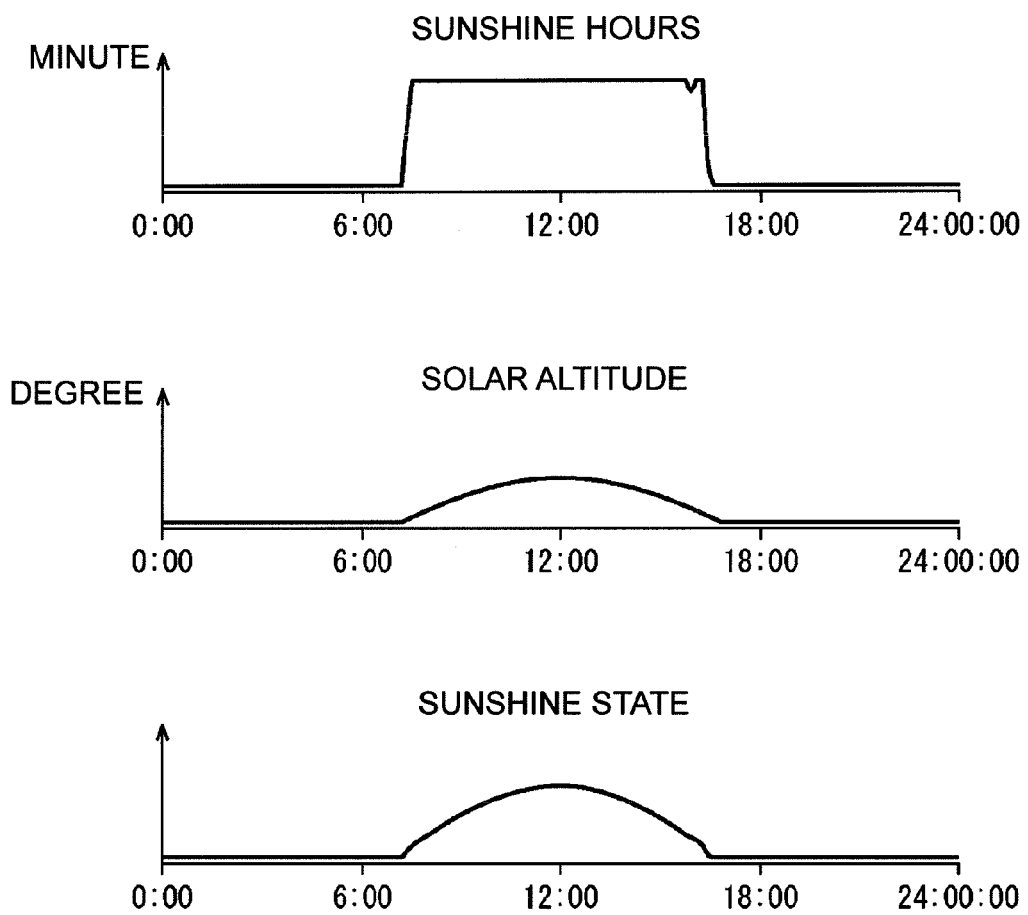
FIG. 5 is a graph illustrating a relationship among sunshine hours, a solar altitude, and a sunshine state of a single day.

FIG. 5 is a graph illustrating a relationship among the sunshine hours s(t), the solar altitude h($\phi$, L, t), and the sunshine state x(t) of a single day. The uppermost graph indicates a change in sunshine hours s(t) in time series, the middle graph indicates a change in solar altitude h($\phi$, L, t) in time series, and the lowermost graph indicates a change in sunshine state x(t) in time series.

As illustrated in FIG. 5, within a range that is less than or equal to a predetermined upper limit, the sunshine state x(t) increases with increasing sunshine hours s(t) or with increasing solar altitude h($\phi$, L, t). On the other hand, within the range that is greater than or equal to zero, the sunshine state x(t) decreases with decreasing sunshine hours s(t) or with decreasing solar altitude h($\phi$, L, t). The sunshine state x(t) becomes zero in the case of the sunshine hours s(t) of zero.

The sunshine state calculator 155 supplies the estimation result of the sunshine state in the learning period to the learning part 158.

In Step S4, the learning part 158 learns the output calculating model. Specifically, the learning part 158 acquires the measured value of the output of the photovoltaic generation part 111 in the learning period from the output measurement data accumulator 157. Using the learning model, the learning part 158 obtains parameters $\lambda 1$ to $\lambda n$ of a model function f( ) which is shown in the following equation (9) and expresses the sunshine state calculating model, based on the measured values of the sunshine state x(t) and the output y(t) in the learning period.

$$y(t)=f\{x(t),\lambda 1, \ldots ,\lambda n\} \quad (9)$$

For example, any learning model, such as a regression model, a neural network, and an SVM (Support Vector Machine) can be adopted as the learning model used in the embodiment. For example, using the linear regression model, the output calculating model can be learned by the following equation (10).

$$y(t)=\lambda 1 \cdot x(t)+\lambda 2 \quad (10)$$

The regression coefficients $\lambda 1$ and $\lambda 2$ that are of the parameters of the equation (10) are calculated by the following equations (11) and (12).

$$\lambda 1 = \sigma y/\sigma x \cdot \rho xy \quad (11)$$

$$\lambda 2 = \mu y - \lambda 1 \cdot \mu x \quad (12)$$

Where $\mu x$ and $\sigma x$ are an average and a standard deviation of the sunshine state x(t), $\mu y$ and $\sigma y$ are an average and a standard deviation of the output y(t), and $\rho xy$ is a correlation coefficient of the sunshine state x(t) and the output y(t).

The learning part 158 accumulates the parameter of the output calculating model, which are constructed as a result of the learning, in the model parameter accumulator 159.

Then the output calculating model learning processing is ended.

[Power Generation Estimation Processing]

Figure 6:
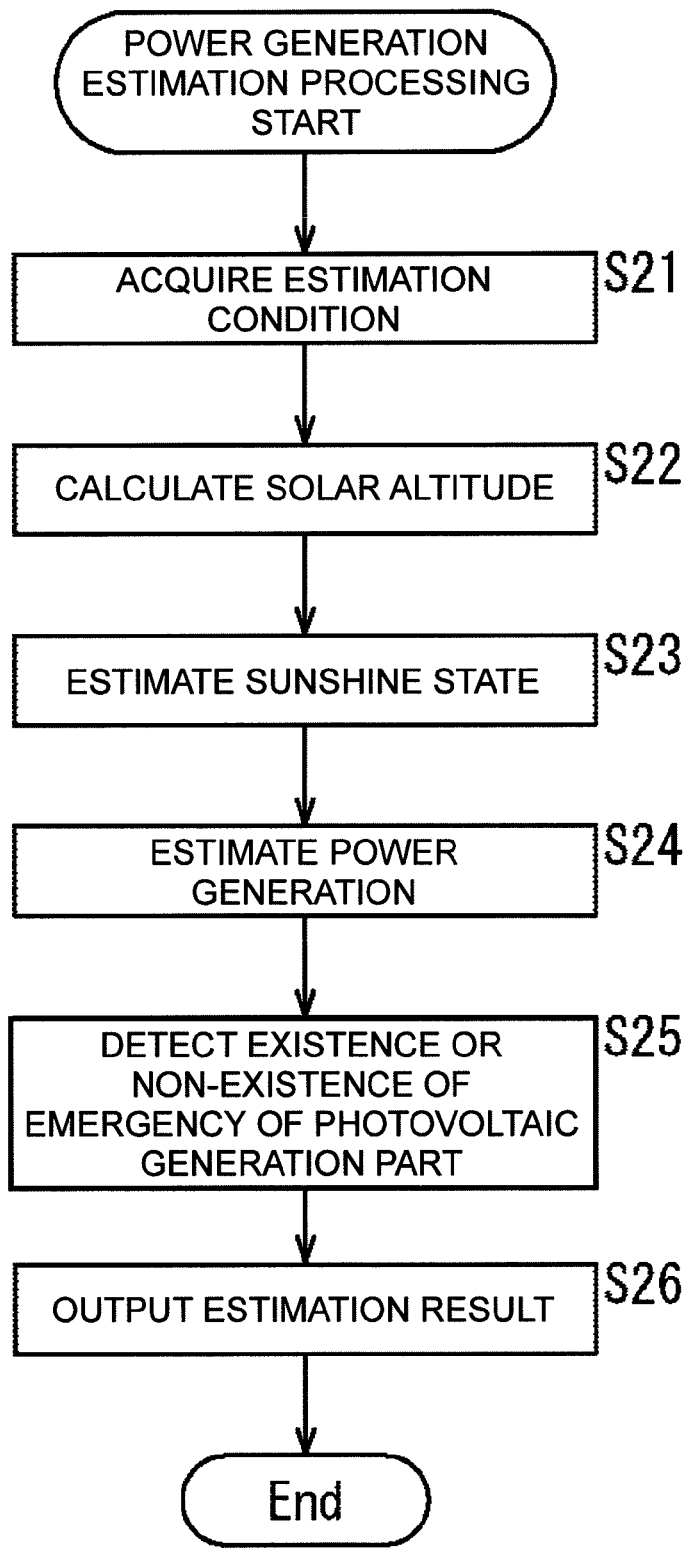
FIG. 6 is a flowchart illustrating power generation estimation processing.

Power generation estimation processing performed by the information processing device 112 will be described with reference to a flowchart in FIG. 6.

In Step S21, the information processing device 112 acquires an estimation condition. For example, the user inputs the latitude and the longitude of the power generation site and the estimation period of the output as the estimation condition. For example, similarly to the learning period, the estimation period is specified by the date and time when the learning is started and the date and time when the learning is ended.

The input part 151 supplies the data indicating the latitude and the longitude of the power generation site to the solar altitude calculator 152. The input part 151 supplies the data indicating the estimation period to the solar altitude calculator 152, the sunshine state calculator 155, and the output calculator 160.

Figure 3:
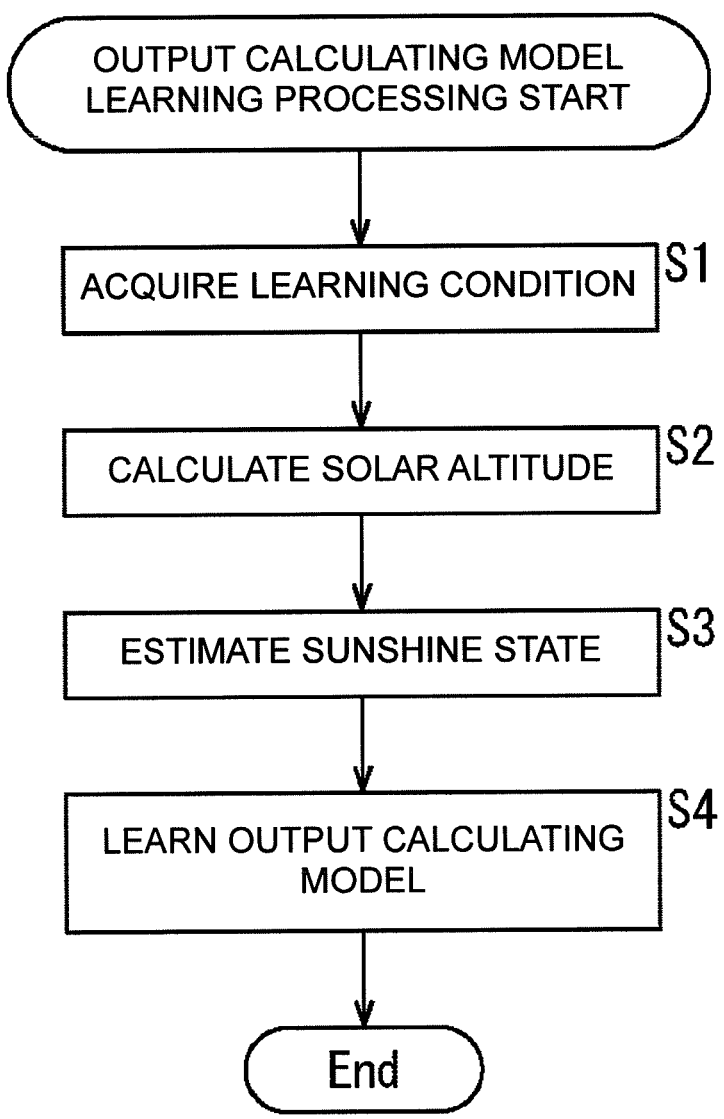
FIG. 3 is a flowchart illustrating output calculating model learning processing.

In Step S22, through the processing similar to that in Step S2 in FIG. 3, the solar altitude calculator 152 calculates the solar altitude around the power generation site in the estimation period. The solar altitude calculator 152 supplies the calculation result to the sunshine state calculator 155.

In Step S23, through the processing similar to that in Step S3 in FIG. 3, the sunshine state calculator 155 estimates the sunshine state around the power generation site in the estimation period. The sunshine state calculator 155 supplies the estimation result to the output calculator 160.

In Step S24, the output calculator 160 estimates the power generation. Specifically, the output calculator 160 acquires the parameter of the output calculating model, which is constructed through the output calculating model learning processing, from the model parameter accumulator 159. The output calculator 160 applies the estimation result of the sunshine state around the power generation site in the estimation period to the output calculating model to estimate the output of the photovoltaic generation part 111 every predetermined time in the estimation period.

FIG. 7 illustrates examples of the pieces of data in which the sunshine hours s(t), the solar altitude h($\phi$, L, t), the sunshine state x(t), and the estimated value of the output y(t) of the photovoltaic generation part 111 are arrayed in time series. For example, the sunshine state x(t) at 10:10 on Dec. 28, 2010 is obtained based on the sunshine hours s(t) between 10:1 and 10:10 on Dec. 28, 2010 and the solar altitude h($\phi$, L, t) at 10:10 on Dec. 28, 2010. Using the output calculating model, the output y(t) of the date and time is estimated based on the sunshine state x(t) at 10:10 on Dec. 28, 2010.

The output calculator 160 supplies the estimation result of the output of the photovoltaic generation part 111 in the estimation period to the emergency detector 161.

In Step S25, the emergency detector 161 detects the existence or non-existence of the emergency of the photovoltaic generation part 111. Specifically, the emergency detector 161 acquires the measured value of the output of the photovoltaic generation part 111 in the same period as the estimation period from the output measurement data accumulator 157. The emergency detector 161 uses the estimated value calculated by the output calculator 160 as the proper value of the output of the photovoltaic generation part 111, and detects the existence or non-existence of the emergency of the photovoltaic generation part 111 by comparing the proper value to the acquired measured value (that is, actual value).

At this point, the outputs in the whole estimation period may be totalized and compared, or the output may be compared every predetermined period (for example, ever month, every day).

Figure 8:
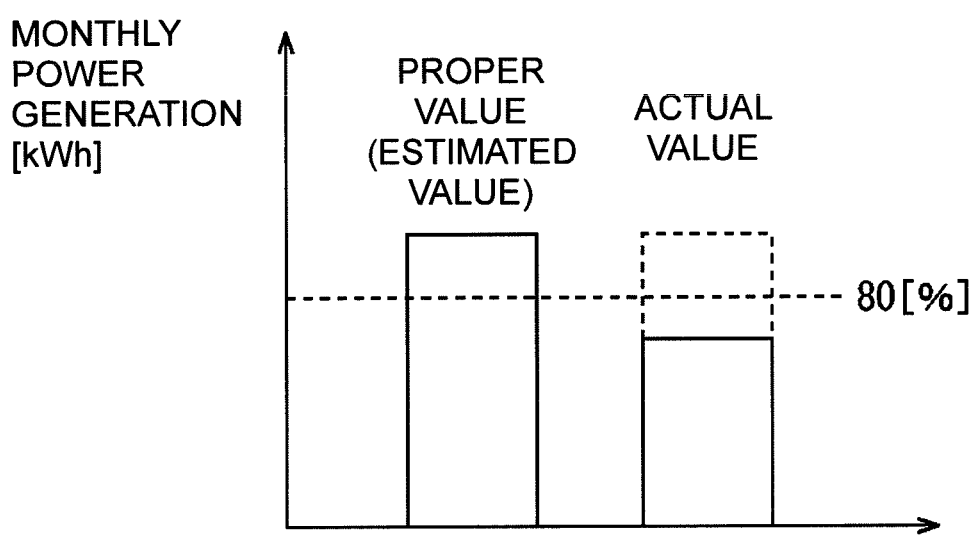
FIG. 8 is a graph illustrating an example in which a proper value and an actual value of power generation of a single month are compared to each other.

FIG. 8 is a graph illustrating an example in which a proper value (estimated value) and an actual value (measured value) of the power generation of a single month are compared to each other. For example, as illustrated in FIG. 8, a threshold (in this case, 80%) is set and a determination that an emergency of some sort is generated in the photovoltaic generation part 111 may be made when the actual value of the output is less than or equal to the threshold of the proper value.

Alternatively, for example, a change in deviation between the proper value and the actual value of the output is calculated every predetermined period (for example, every month) using the following equation (13), and the existence or non-existence of the emergency of the photovoltaic generation part 111 may be detected by monitoring the change in deviation.

$$\text{change in deviation}(\%) = (\text{proper value} - \text{actual value}) / \text{proper value} \times 100 \quad (13)$$

Figure 9:
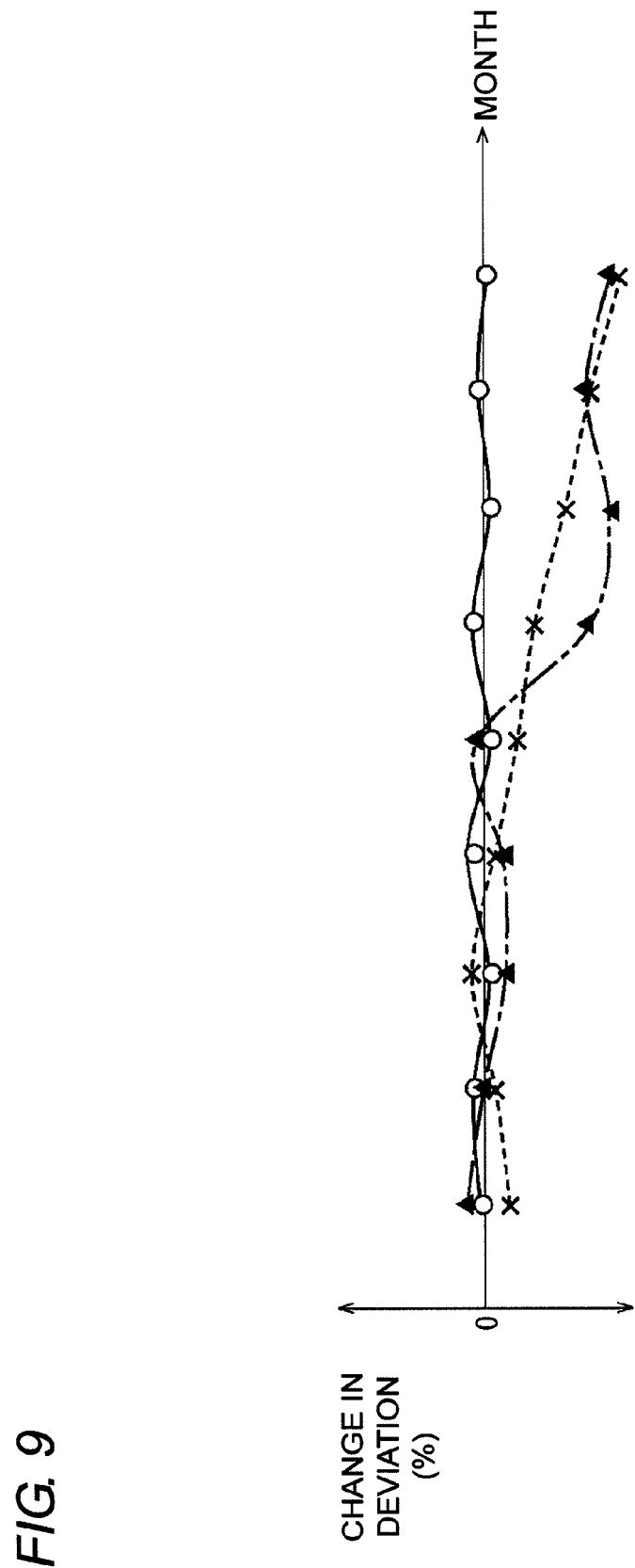
FIG. 9 is a graph illustrating an example of a change in deviation between the proper value and the actual value of monthly power generation.

FIG. 9 is a graph illustrating an example of the change in deviation between the proper value and the actual value of the monthly power generation.

For example, the estimation that the photovoltaic generation part 111 is normal can be performed in the case that the change in deviation falls within a predetermined range around 0% like a graph illustrated by a solid line.

On the other hand, the estimation that the output of the photovoltaic generation part 111 decreases due to, for example, degradation over time can be performed in the case that the change in deviation decreases gradually like a graph illustrated by a dotted line.

The estimation that the output of the photovoltaic generation part 111 decreases due to, for example, a sudden emergency can be performed in the case that the change in deviation decreases rapidly like a graph illustrated by an alternate long and short dash line.

Not only the detection of the existence or non-existence of the emergency of the photovoltaic generation part 111, but also the estimation of the cause of the emergency can be performed by monitoring the change in deviation.

The emergency detector 161 supplies the detection result to the output part 162.

In Step S26, the output part 162 outputs the estimation result. For example, the output part 162 displays a table or a graph indicating the changes in proper value and actual value of the output on a display.

At this point, the existence or non-existence of the emergency of the photovoltaic power system 101 may be displayed or the user may be notified of the existence or non-existence of the emergency of the photovoltaic power system 101 by the light or the sound. For example, the output part 162 transmits the data indicating the proper value and the actual value of the output to an external server, a mobile terminal, a printer, and a storage device.

Then the power generation estimation processing is ended.

As described above, the output of the photovoltaic generation part 111 can properly be estimated according to environment conditions, such as a reason and a meteorological phenomenon, using not the solar radiation amount and the solar radiation intensity, but only the sunshine hours.

It is not necessary for the user to set parameters, such as the solar panel installation orientation, the solar panel installation angle, manufacturer, and design information (for example, rated output value), but the estimated value of the output can properly be obtained only by setting the latitude and the longitude of the power generation site.

For example, the latitude and the longitude of the power generation site can automatically be measured with a GPS.

[Power Generation Prediction Processing]

Figure 10:
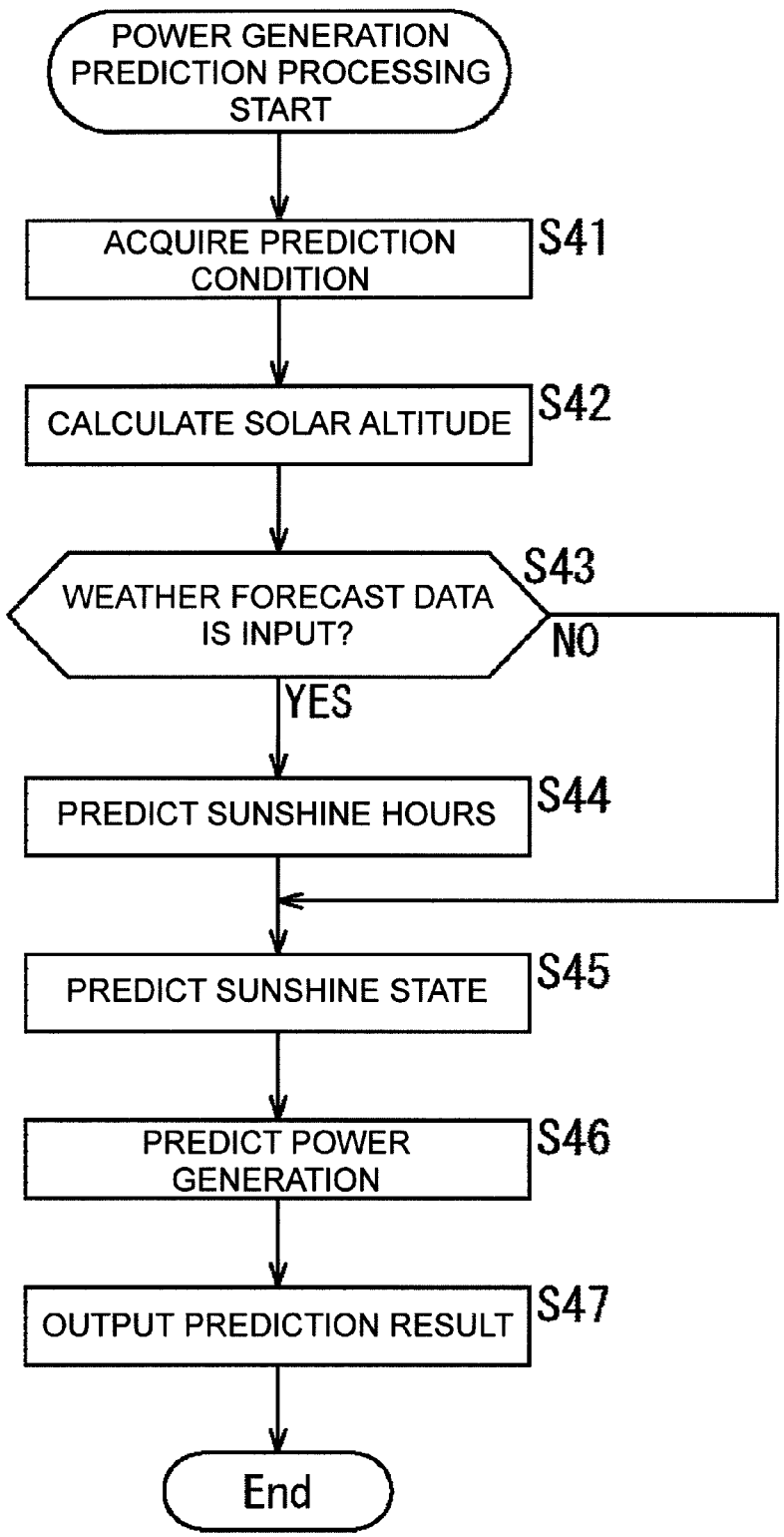
FIG. 10 is a flowchart illustrating power generation prediction processing.

Power generation prediction processing performed by the information processing device 112 will be described below with reference to FIG. 10.

In Step S41, the information processing device 112 acquires a prediction condition. Specifically, for example, the user inputs the latitude and the longitude of the power generation sit, the prediction period of the output, and the sunshine hours predicted data or the weather forecast data in the prediction period as the prediction condition. For example, similarly to the learning period, the prediction period is specified by the date and time when the learning is started and the date and time when the learning is ended.

For example, the sunshine hours predicted data has the same configuration as the sunshine hours measurement data, and is expressed by the predicted value of the sunshine hours of every unit time. It is not always necessary to set the unit time to the same time as the sunshine hours measurement data, but the unit time may be set to a time (for example, 30 minutes or 1 hour) longer than that of the sunshine hours measurement data.

The data of the daily weather forecast may be used as the weather forecast data, or the weather forecast data in each predetermined unit time (for example, every six hours) may be used as the weather forecast data.

The input part 151 supplies the data indicating the latitude and the longitude of the power generation site to the solar altitude calculator 152. The input part 151 supplies the data indicating the prediction period to the solar altitude calculator 152, the sunshine state calculator 155, and the output calculator 160. When the sunshine hours predicted data is input, the input part 151 supplies the sunshine hours predicted data to the sunshine state calculator 155. When the weather forecast data is input, the input part 151 supplies the weather forecast data and the data indicating the prediction period to the sunshine hours predicting part 153.

In Step S42, through the processing similar to that in Step S2 in FIG. 3, the solar altitude calculator 152 calculates the solar altitude around the power generation site in the prediction period. The solar altitude calculator 152 supplies the calculation result to the sunshine state calculator 155.

In Step S43, the sunshine hours predicting part 153 determines whether the weather forecast data is input. When the weather forecast data is input, the processing goes to Step S44.

In Step S44, the sunshine hours predicting part 153 predicts the sunshine hours. For example, the sunshine hours predicting part 153 sets the sunshine hours in the time period in which the forecast is sunny to a maximum value (that is, the same value as the unit time), and sets the sunshine hours in other time periods to a value corresponding to the weather forecast, thereby generating the sunshine hours predicted data indicating the predicted value of the sunshine hours in the prediction period.

Figure 11:
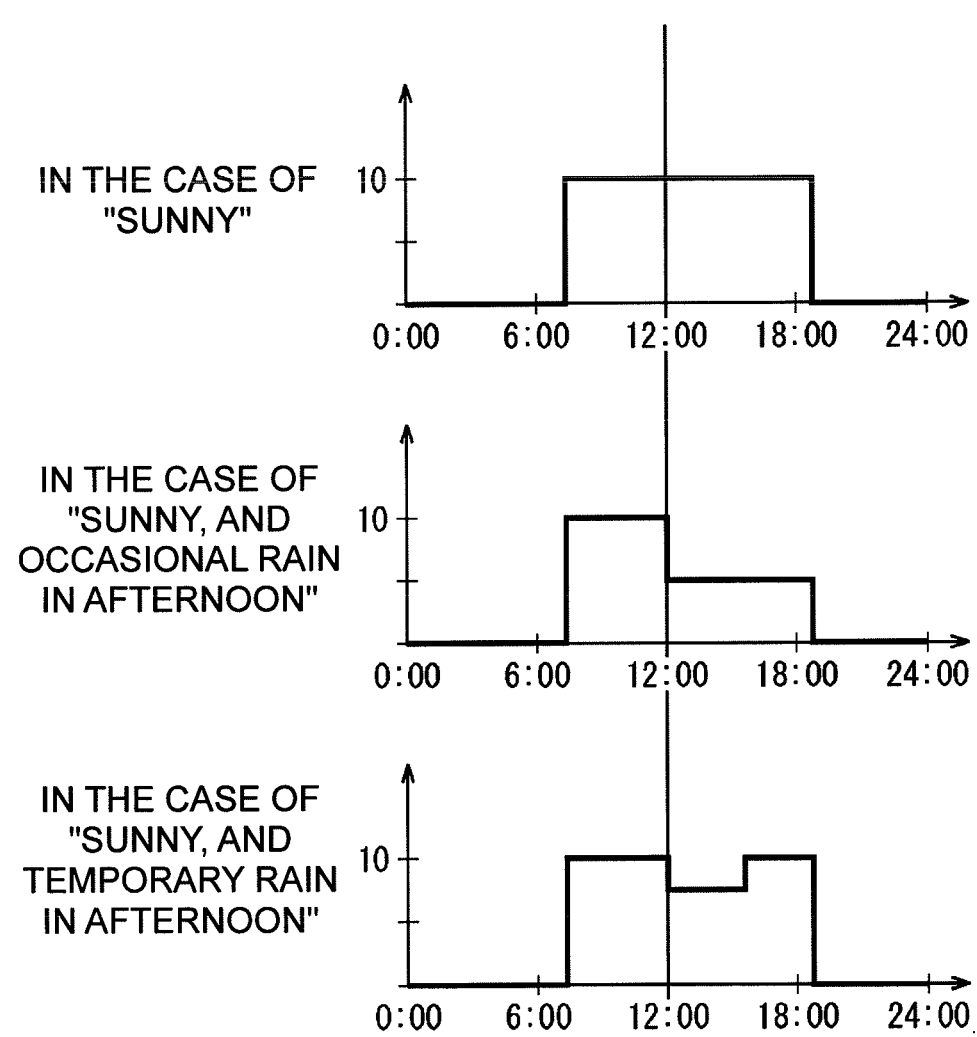
FIG. 11 is a graph illustrating an example of sunshine hours predicted data that is generated based on a weather forecast.

For example, FIG. 11 illustrates an example of the sunshine hours predicted data that is generated based on the weather forecast. A horizontal axis indicates time, and a vertical axis indicates the sunshine hours predicted value in each unit time. A vertical line in the center indicates the noon.

For example, in the case that the weather forecast is "sunny", as illustrated in the uppermost graph, the predicted value of the sunshine hours in each unit time is set to the maximum value (that is, the same value as the unit time) in a period from a sunrise to a sunset.

For example, in the case that the weather forecast is "sunny, and occasional rain in the afternoon", as illustrated in the middle graph, the predicted value of the sunshine hours in each unit time is set to the maximum value in a period from the sunrise to the noon, and the predicted value of the sunshine hours in each unit time is set to a half of the maximum value in a period from the noon to the sunset.

For example, in the case that the weather forecast is "sunny, and temporary rain in the afternoon", as illustrated in the lowermost graph, the predicted value of the sunshine hours in each unit time of a predetermined time period (for example, twelve to fifteen) in the afternoon is set to three-fourths of the maximum value in the period from the sunrise to the sunset, and the predicted value of the sunshine hours in other time periods is set to the maximum value.

The above example is based on such the definition that, in the weather forecast, midnight to three are expressed by "before dawn", three to six are expressed by "dawn", six to nine are expressed by "morning", nine to twelve are expressed by "before noon", twelve to fifteen are expressed by "afternoon", fifteen to eighteen are expressed by "evening, eighteen to twenty-one are expressed by "early night", twenty-one to twenty-four are expressed by "late night", the case that a certain phenomenon is intermittently generated while a duration of the phenomenon is less than a half of the forecast period, is expressed by "occasional", and the case that a certain phenomenon is continuously generated while the duration of the phenomenon is less than a quarter of the forecast period, is expressed by "temporary".

The sunshine hours predicting part 153 supplies the generated sunshine hours predicted data to the sunshine state calculator 155.

Then the processing goes to Step S45.

On the other hand, when the weather forecast data is not input in Step S43, namely, when the sunshine hours predicted data is input instead of the weather forecast data, the processing in Step S44 is skipped, and the processing goes to Step S45.

In Step S45, the sunshine state calculator 155 predicts the sunshine state. Specifically, similarly to the estimation of the sunshine hours predicted data, the sunshine state calculator 155 calculates the predicted value of the sunshine state $x(t)$ every predetermined time in the prediction period by the equation (7) using the sunshine hours predicted data instead of the sunshine hours measurement data. The sunshine state calculator 155 supplies the prediction result of the sunshine state in the prediction period to the output calculator 160.

In Step S46, the output calculator 160 predicts the power generation. Specifically, similarly to the processing in Step S24 in FIG. 6, the output calculator 160 applies the prediction result of the sunshine state in the prediction period, which is supplied from the sunshine state calculator 155, to the output calculating model to predict the output of the photovoltaic generation part 111 every predetermined time in the prediction period. The output calculator 160 supplies the prediction result of the output of the photovoltaic generation part 111 in the prediction period to the output part 162.

In Step S47, the output part 162 outputs the prediction result. For example, the output part 162 displays a graph indicating the changes in predicted value of the output on the display. For example, the output part 162 transmits the data indicating the predicted value of the output to an external server, a mobile terminal, a printer, and a storage device.

Then the power generation prediction processing is ended.

As described above, only by setting the latitude and the longitude of the power generation site to input the sunshine hours predicted data or the weather forecast data, the output of the photovoltaic generation part 111 can easily and properly be predicted according to environment conditions, such as the season and the meteorological phenomenon, without the use of the predicted value of the solar radiation amount or the solar radiation intensity.

Figure 12:
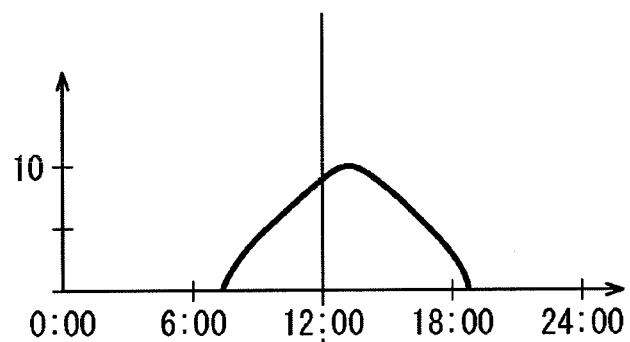
FIG. 12 is a graph illustrating an example of the power generation that is predicted using the sunshine hours predicted data in FIG. 11.
Figure 12:
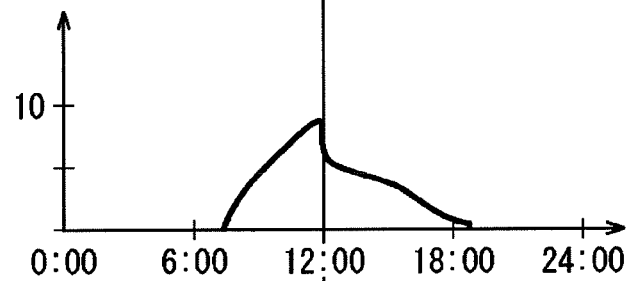
Figure 12:
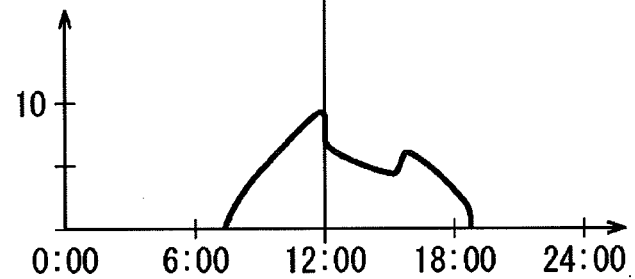

For example, FIG. 12 illustrates an example of a daily change in output that is predicted based on the sunshine hours predicted data in FIG. 11. Thus, the power generation can be predicted using not the detailed sunshine hours predicted data, but only the weather forecast.

2. Modifications

Modifications of the embodiment of the present invention will be described below.

Because the solar altitude varies largely depending on the season, desirably different output calculating models are used every predetermined period (for example, every month or every season) in order to enhance estimation accuracy and prediction accuracy of the output.

For example, it is conceivable that the monthly output calculating model is constructed by performing the learning using the sunshine hours measurement data and the output measurement data in the same month of the last year. In this case, for example, the learning may be performed using the pieces of sunshine hours measurement data and output measurement data in the same months in the past several years.

For example, it is conceivable that the monthly output calculating model is constructed by performing the learning using the sunshine hours measurement data and the output measurement data in the month immediately before the month in which the learning is performed. For example, in the case that the output calculating model of October is learned, it is conceivable that the learning is performed using the sunshine hours measurement data and the output measurement data in September of the same year.

In the above examples, because the power generation becomes zero for the time period in which the sunshine hours are zero, the measured value or the predicted value of the output also becomes zero. However, even in the time period in which the sunshine hours are zero, the solar radiation amount does not completely become zero, but it is not always true that the power generation becomes zero.

Figure 13:
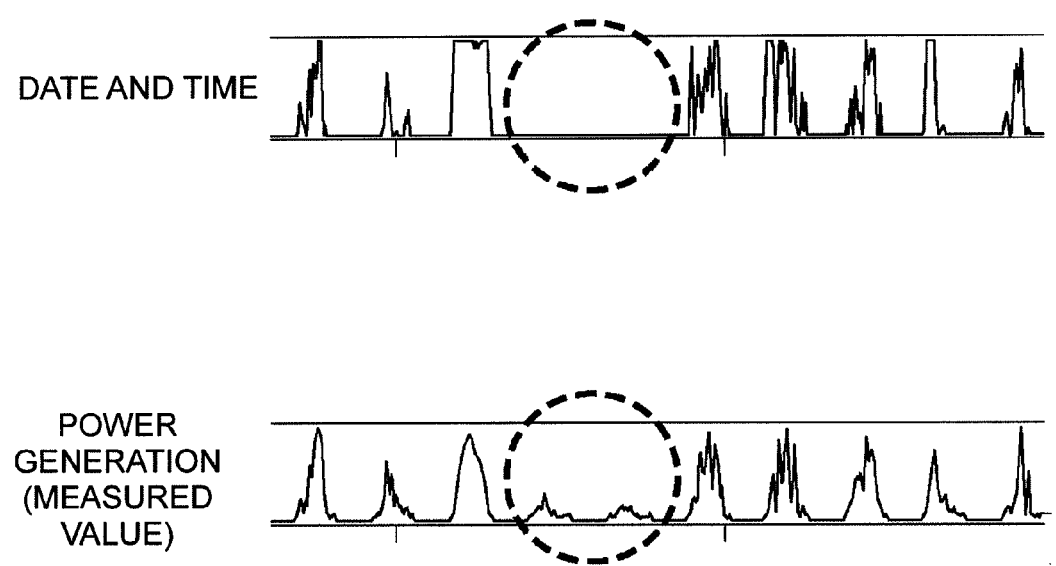
FIG. 13 is a graph illustrating an example of time-series changes of measured values of the sunshine hours and the power generation.

For example, FIG. 13 illustrates an example of time-series changes of measured values of the sunshine hours and the power generation. The upper graph indicates the change in sunshine hours, and the lower graph indicates the change in measured value of the output. In FIG. 13, in the time period surrounded by a dotted-line circle, sometimes the output does not become zero while the sunshine hours are zero.

Therefore, in the time period in which the sunshine hours are zero, the output may be estimated or predicted using a model (hereinafter referred to as a second output calculating model) different from the above output calculating model.

For example, daily the pieces of output measurement data on the day in which the daily sunshine hours are less than predetermined threshold (for example, less than ten minutes) are acquired for at least the predetermined number of days (for example, ten days), and an average of the measured values of the outputs is calculated in each time period, and a model constructed by the average values may be used as the second output calculating model.

Figure 14:
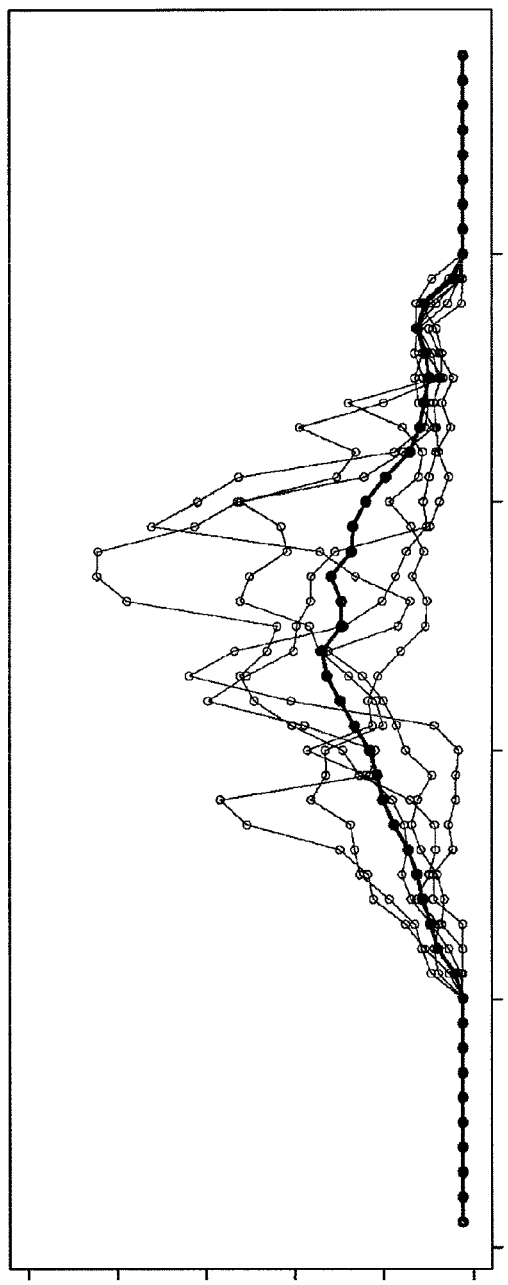
FIG. 14 is a view illustrating a method for constructing a second output calculating model.

For example, FIG. 14 illustrate plural thin-line graphs illustrating changes in measured values of the outputs on different days in each of which the daily sunshine hours are less than the threshold. On the other hand, a bold-line graph is a graph in which the thin-line graphs are averaged, namely, a graph illustrating the change in average of the measured values of the outputs in each time period of the thin-line graphs. It is conceivable that the model indicated by the bold-line graph is used as the second output calculating model.

In this case, for example, the time unit to which the second output calculating model is applied is arbitrary. For example, the second output calculating model may be used only in the case of the calculation of the output on the day in which the daily sunshine hours are less than the threshold.

Alternatively, for example, the second output calculating model may be used for all the time periods in each of which the sunshine hours are zero. That is, the output is calculated for the time period in which the sunshine hours are not zero using the normal output calculating model, and the output in the same time period as the second output calculating model may be applied to the output in the time period in which the sunshine hours are zero.

Therefore, the output in the time period in which the sunshine hours are zero can more properly be estimated or predicted.

For the second power generation prediction model, desirably different models are constructed very predetermined period (for example, every month or every season).

[Configuration Example of Computer]

The above sequence of pieces of processing can be performed by hardware or software. In the case that the above sequence of pieces of processing are performed by the software, a program constituting the software is installed in a computer. Examples of the computer include a computer that is incorporated in dedicated hardware and a general-purpose personal computer in which various functions can be performed by installing various programs.

Figure 15:
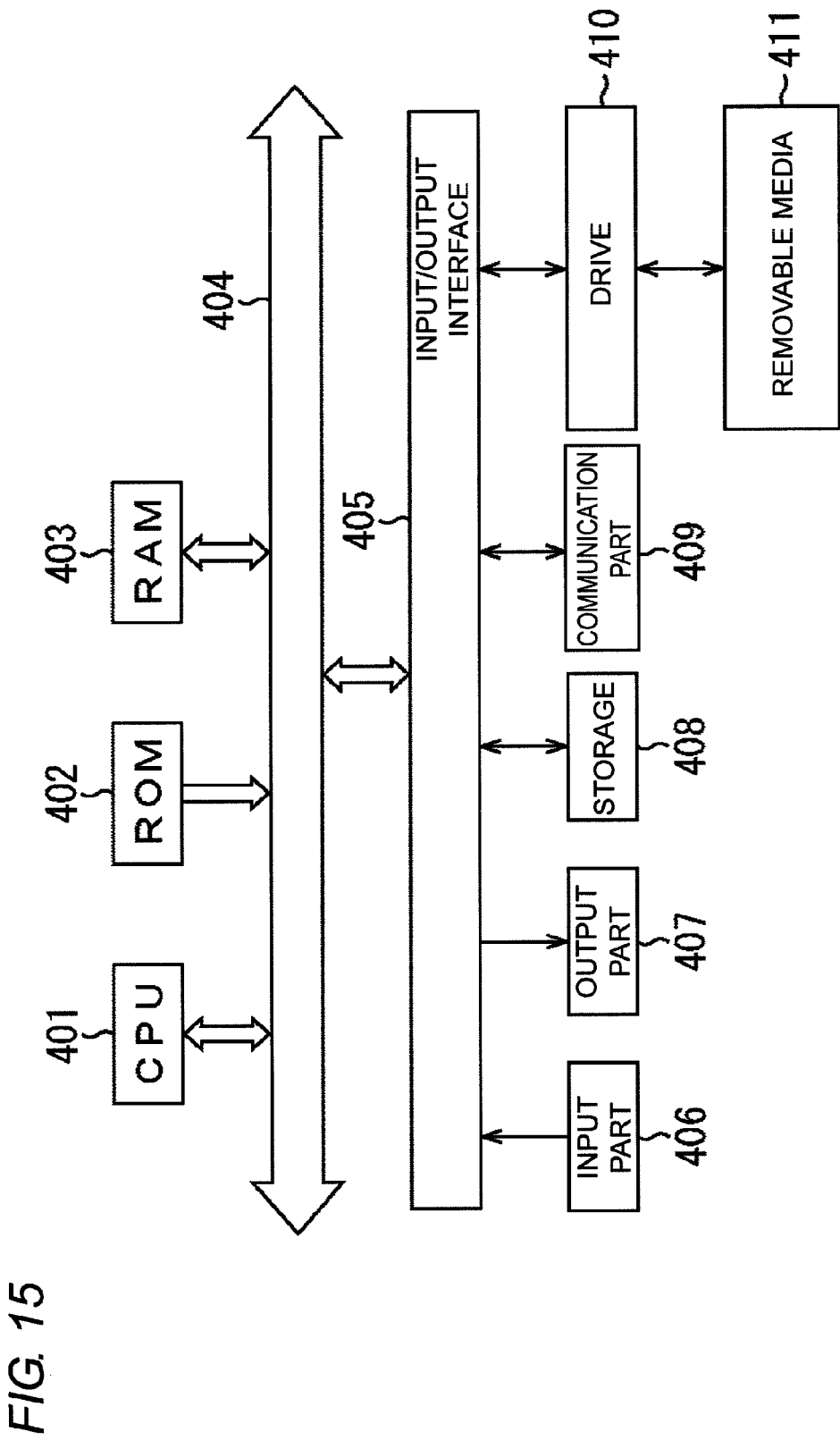
FIG. 15 is a block diagram illustrating a configuration example of a computer.

FIG. 15 is a block diagram illustrating a configuration example of hardware of the computer that performs the above sequence of pieces of processing using the program.

In the computer, a CPU (Central Processing Unit) 401, a ROM (Read Only Memory) 402, and a RAM (Random Access Memory) 403 are connected to one another through a bus 404.

The bus 404 is also connected to an input/output interface 405. An input part 406, an output part 407, a storage 408, a communication part 409, and a drive 410 are connected to the input/output interface 405.

For example, the input part 406 includes a keyboard, a mouse, and a microphone. For example, the output part 407 includes a display and a speaker. For example, the storage 408 includes a hard disk and a nonvolatile memory. For example, the communication part 409 includes a network interface. The drive 410 drives a removable medium 411, such as a magnetic disk, an optical disk, a magneto-optical disk, and a semiconductor memory.

In the computer having the above configuration, for example, the CPU 401 loads and executes the program stored in the storage 408 on the RAM 403 through the input/output interface 405 and the bus 404, thereby performing the above sequence of pieces of processing.

For example, the program executed by the computer (CPU 401) can be provided while recorded as a package medium in the removable medium 411. The program can also be provided through wired or wireless transmission mediums, such as a local area network, the Internet, and digital satellite broadcasting.

In the computer, the program can be installed in the storage 408 through the input/output interface 405 by attaching the removable medium 411 to the drive 410. The program can be received by the communication part 409 through the wire or wireless transmission medium, and installed in the storage 408. Alternatively, the program can previously be installed in the ROM 402 or the storage 408.

The program executed by the computer may be a program in which the processing is performed in time series along the order described above or a program in which the processing is performed in parallel or in necessary timing, such as timing in which calling is performed.

In the description, the system means a set of plural structural elements (such as a device and a module (component)), and whether all the structural elements are provided in the same chassis is not a question. Accordingly, both the plural devices that are accommodated in individual chassis and connected through the network and one device in which plural modules are accommodated in one chassis are the systems.

The information processing device 112 in FIG. 2 may be constructed by plural devices, or some of the structural elements of the information processing device 112 may be provided in another device. For example, the solar altitude data, the calculation result of the power generation state, and the output measurement data may be acquired from the outside while the solar altitude calculator 152, the sunshine state calculator 155, and the output measuring part 156 are provided in another device.

The structural element or the function of the information processing device 112 may be eliminated according to the intended use. For example, in the case that it is not necessary to predict the output, the sunshine hours predicting part 153 can be eliminated. For example, in the case that it is not necessary to detect the emergency of the photovoltaic generation part 111, the emergency detector 161 can be eliminated.

The present invention is not limited to the embodiment, but various changes can be made without departing from the scope of the present invention.

For example, the invention can take a configuration of cloud computing in which one function is shared by plural devices through the network and processed by cooperating with each other.

Not only each step in the flowchart can be performed by one device, but also the step can be performed while shared by plural devices.

In the case that plural pieces of processing are included in one step, not only the pieces of processing included in one step can be performed by one device, but also the pieces of processing can be performed while shared by plural devices.

What is claimed is:

1. An information processor, comprising:
    a model constructing processor that constructs a first model based on a measured value of an output of photovoltaic generation, sunshine hours, and a solar altitude in a first period,
    the first model calculating the output of the photovoltaic generation based on the sunshine hours and the solar altitude; and
    an output calculator that calculates the output of the photovoltaic generation in a second period based on the sunshine hours and the solar altitude in the second period using the first model.

2. The information processor according to claim 1, wherein the first model calculates the output of the photovoltaic generation based on a sunshine state obtained by a product of the sunshine hours and a sine of the solar altitude.

3. The information processor according to claim 2, further comprising:
    a solar altitude calculator that calculates the solar altitude on specified latitude and longitude; and
    a sunshine state calculator that calculates the sunshine state based on provided data of the sunshine hours and the solar altitude calculated by the solar altitude calculator, wherein the output calculator calculates the output of the photovoltaic generation based on the sunshine state calculated by the sunshine state calculator.

4. The information processor according to claim 3, further comprising a sunshine hours predicting processor that predicts the sunshine hours based on a weather forecast, wherein the sunshine state calculator calculates a predicted value of the sunshine state based on the sunshine hours predicted by the sunshine hours predicting processor, and
    the output calculator calculates a predicted value of the output of the photovoltaic generation based on the predicted value of the sunshine state.

5. The information processor according to claim 4, wherein the model constructing processor further constructs a second model based on the measured value of the output of the photovoltaic generation in a period in which the sunshine hours are zero, the second model calculating the output of the photovoltaic generation in the period in which the sunshine hours are zero, and
    the output calculator calculates the output of the photovoltaic generation using the second model in the period in which the sunshine hours are zero in the second period.

6. The information processor according to claim 4, further comprising an emergency detector that detects an emergency of a system performing the photovoltaic generation by comparing a calculated value of the output of the photovoltaic generation, which is calculated by the output calculator in the second period, and the measured value of the output of the photovoltaic generation in the second period.

7. The information processor according to claim 4, further comprising an output measuring processor that measures the output of the photovoltaic generation, wherein the model constructing processor constructs the first model based on the measured value of the output of the photovoltaic generation, which is measured by the output measuring processor in the first period.

8. The information processor according to claim 3, wherein the model constructing processor further constructs a second model based on the measured value of the output of the photovoltaic generation in a period in which the sunshine hours are zero, the second model calculating the output of the photovoltaic generation in the period in which the sunshine hours are zero, and
    the output calculator calculates the output of the photovoltaic generation using the second model in the period in which the sunshine hours are zero in the second period.

9. The information processor according to claim 3, further comprising an emergency detector that detects an emergency of a system performing the photovoltaic generation by comparing a calculated value of the output of the photovoltaic generation, which is calculated by the output calculator in the second period, and the measured value of the output of the photovoltaic generation in the second period.

10. The information processor according to claim 3, further comprising an output measuring processor that measures the output of the photovoltaic generation, wherein the model constructing processor constructs the first model based on the measured value of the output of the photovoltaic generation, which is measured by the output measuring processor in the first period.

11. The information processor according to claim 2, wherein the model constructing processor further constructs a second model based on the measured value of the output of the photovoltaic generation in a period in which the sunshine hours are zero, the second model calculating the output of the photovoltaic generation in the period in which the sunshine hours are zero, and
    the output calculator calculates the output of the photovoltaic generation using the second model in the period in which the sunshine hours are zero in the second period.

12. The information processor according to claim 2, further comprising an emergency detector that detects an emergency of a system performing the photovoltaic generation by comparing a calculated value of the output of the photovoltaic generation, which is calculated by the output calculator in the second period, and the measured value of the output of the photovoltaic generation in the second period.

13. The information processor according to claim 2, further comprising an output measuring processor that measures the output of the photovoltaic generation, wherein the model constructing processor constructs the first model based on the measured value of the output of the photovoltaic generation, which is measured by the output measuring processor in the first period.

14. The information processor according to claim 1, wherein the model constructing processor further constructs a second model based on the measured value of the output of the photovoltaic generation in a period in which the sunshine hours are zero, the second model calculating the output of the photovoltaic generation in the period in which the sunshine hours are zero, and the output calculator calculates the output of the photovoltaic generation using the second model in the period in which the sunshine hours are zero in the second period.

15. The information processor according to claim 1, further comprising an emergency detector that detects an emergency of a system performing the photovoltaic generation by comparing a calculated value of the output of the photovoltaic generation, which is calculated by the output calculator in the second period, and the measured value of the output of the photovoltaic generation in the second period.

16. The information processor according to claim 1, further comprising an output measuring processor that measures the output of the photovoltaic generation, wherein the model constructing processor constructs the first model based on the measured value of the output of the photovoltaic generation, which is measured by the output measuring processor in the first period.

17. A computer implemented power generation determining method, comprising:
   constructing, using a computer, a model based on a measured value of an output of photovoltaic generation, sunshine hours, and a solar altitude in a first period, the model calculating the output of the photovoltaic generation based on the sunshine hours and the solar altitude; and
   calculating, using the computer, the output of the photovoltaic generation in a second period based on the sunshine hours and the solar altitude in the second period using the model.

18. The power generation determining method according to claim 17, further comprising measuring the output of the photovoltaic generation in the first period, wherein the model is constructed based on the measured value of the output of the photovoltaic generation, which is measured in the first period in the measuring of the output.

19. A non-transitory computer readable medium storing a program that causes a computer to perform processing, the processing comprising:
   constructing a model based on a measured value of an output of photovoltaic generation, sunshine hours, and a solar altitude in a first period, the model calculating the output of the photovoltaic generation based on the sunshine hours and the solar altitude; and
   calculating the output of the photovoltaic generation in a second period based on the sunshine hours and the solar altitude in the second period using the model.

20. A photovoltaic power system, comprising:
   a photovoltaic generator that performs photovoltaic generation;
   an output measuring processor that measures an output of the photovoltaic generator;
   a model constructing processor that constructs a model based on a measured value of the output of the photovoltaic generator, sunshine hours, and a solar altitude in a first period, the model calculating the output of the photovoltaic generator based on the sunshine hours and the solar altitude; and
   an output calculator that calculates the output of the photovoltaic generator in a second period based on the sunshine hours and the solar altitude in the second period using the model.

* * * * *